United States Patent Office 2,766,268
Patented Oct. 9, 1956

2,766,268

PRODUCTION OF FERROUS SALTS OF MONO-AMINO LOWER ALIPHATIC DICARBOXYLIC ACIDS

William G. Skelly, Northbrook, Ill., assignor to International Minerals & Chemical Corporation, a corporation of New York No Drawing. Application October 13, 1953,
Serial No. 385,885

11 Claims. (Cl. 260—439)

The instant invention relates to the preparation of salts of amino acids. More particularly, it relates to the preparation of substantially pure ferrous salts of monoamino dicarboxylic acids, such as ferrous glutamate and ferrous aspartate.

A ferrous glutamate-containing product has been prepared in the past by refluxing glutamic acid with iron filings (Beilstein, volumes III and IV, page 538). The product contained between about 40% and about 60% of ferrous glutamate, the remainder of the product being the ferrous salt of pyrrolidone carboxylic acid, which is the lactam of glutamic acid. Obviously, this is not a satisfactory process for the production of ferrous glutamate. This compound has pharmaceutical value for the treatment of people with an iron deficiency. Use of the ferrous glutamate has an advantage over other iron compounds, such as ferrous gluconate or ferrous citrate, because unlike these compounds, the glutamate does not have a bitter, disagreeable taste.

It is an object of the instant invention to provide a process for the preparation of ferrous glutamate and ferrous aspartate.

It is a further object of the instant invention to provide a process for the preparation of substantially pure ferrous glutamate which is free of the ferrous salt of pyrrolidone carboxylic acid.

It is a further object of the instant invention to provide a process for the production of substantially pure ferrous glutamate suitable for pharmaceutical purposes and in high yield.

These and other objects of the instant invention will become more apparent as hereinafter described.

It has been discovered that an alkaline earth metal salt of a monoamino dicarboxylic acid, such as barium glutamate, barium aspartate, calcium glutamate, or calcium aspartate, reacts with certain ferrous salts in the presence of metallic iron in an atmosphere of a non-oxidizing gas to form the ferrous salt of the amino acid.

In one practice of the instant invention, an alkaline earth metal glutamate, such as barium glutamate or calcium glutamate, is decomposed by a water soluble ferrous salt, which forms a water insoluble salt with the alkaline earth metal, in the presence of metallic iron and in an atmosphere of a non-oxidizing gas which is inert under the conditions obtaining. The insoluble alkaline earth metal salt is separated from the ferrous glutamate-containing solution, for example by filtration in a non-oxidizing atmosphere. The solution from which the salt has been separated is then evaporated to complete dryness to obtain the ferrous glutamate monohydrate product. The product is substantially pure and free from contamination with the ferrous salt of pyrrolidone carboxylic acid.

In another embodiment of the instant invention, barium glutamate or aspartate prepared by heating barium hydroxide and an aqueous suspension of glutamic acid or aspartic acid in the presence of metallic iron is reacted preferably with ferrous sulfate in an inert non-oxidizing atmosphere, preferably a nitrogen atmosphere. After the reaction forming the ferrous salt of the amino acid has been completed, the insoluble barium salt is separated, for example by filtration in an inert non-oxidizing atmosphere, such as nitrogen or carbon dioxide. However, it is preferred to displace the nitrogen atmosphere with a carbon dioxide atmosphere which performs the functions of protecting the products from oxygen and of reacting with any residual barium present in the solution to form an insoluble salt. The precipitate is washed with carbonated water which is free of air, and the resulting filtrate and wash water are evaporated to complete dryness under reduced pressure to obtain the ferrous salt of the amino acid.

In another embodiment of the instant invention, calcium glutamate or aspartate is decomposed with an iron salt. For example, the calcium glutamate is prepared by the reaction of calcium hydroxide and glutamic acid in an inert non-oxidizing atmosphere, such as nitrogen. A small amount of iron filings are preferably present in the reaction mixture. A ferrous salt, such as ferrous sulfate, and iron filings are then added to the calcium glutamate in aqueous medium. After the reaction has proceeded to substantial equilibrium, the nitrogen atmosphere is preferably replaced with an atmosphere of carbon dioxide. The insoluble calcium salt is separated from the reaction products by filtration. The resulting solution is evaporated to dryness under reduced pressure to obtain ferrous glutamate.

In a specific embodiment of the instant invention, about one mole of glutamic acid and about 0.5 mole of barium hydroxide in aqueous medium is heated to between about 90° C. and about 105° C. in the presence of between about 5% and about 25% of a filter aid, and between about 1% and about 10% of metallic iron having a mesh size between about 20 and about 60. The reaction is carried out in an atmosphere of nitrogen. After the reaction in which the barium glutamate is formed has proceeded to substantial equilibrium, a mixture containing about 0.5 mole ferrous sulfate dissolved in water and between about .01% and about 0.1% of iron filings are added to the barium glutamate. The atmosphere of nitrogen is then replaced with an atmosphere of carbon dioxide, and barium sulfate which precipitates from the mixture of reaction products is separated by filtration under an atmosphere of carbon dioxide. The barium sulfate precipitate is washed with carbonated water which is free of air. The resulting liquor, which has been separated from the barium sulfate, is then evaporated under reduced pressure to complete dryness to obtain the ferrous glutamate. The yield of substantially pure ferrous glutamate is about 98% or better.

The following examples are presented in order to afford a clearer understanding of the practice of the instant invention, but it is understood that they are illustrative only and there is no intention to limit the invention thereto.

*Example 1*

An aqueous suspension of about 147 grams of glutamic acid and about 157.7 grams of barium hydroxide octahydrate were combined in a flask and heated to boiling with stirring. About 5 grams of degreased iron filings of about 40 mesh size were added to the mixture, and nitrogen was bubbled into the suspension until an atmosphere free of air was obtained. A mixture containing about 139 grams of ferrous sulfate heptahydrate dissolved in about 250 cc. of water and about 0.13 gram of iron filings was added to the resulting mixture under a carbon dioxide atmosphere. The addition of the sulfate solution was completed in about 2 minutes. The atmosphere of nitrogen was then displaced with carbon dioxide. Barium sulfate which formed in the reaction was separated by filtration in an atmosphere of carbon dioxide. The filter cake was washed with air-free carbonated water. The filtrate was evaporated under reduced pressure on a steam bath to complete dryness. The ferrous glutamate monohydrate was stable to the atmosphere and of light tan color. About 183 grams of product were obtained. This represents a yield of about 98.5%. It analyzed approximately as follows:

|  | Theory | Found |
| --- | --- | --- |
|  | Percent | Percent |
| Moisture | 4.92 | 4.88 |
| Glutamic acid | 80.0 | 75.1 |
| Nitrogen | 7.66 | 7.32 |
| Iron | 15.27 | 15.1 |
| Pyrrolidone carboxylic acid | 0 | 0 |
| Barium | 0 | 0 |
| Sulfate | 0 | 0 |

*Example II*

About 50.3 gallons of water, 102.8 pounds of glutamic acid, 91.4 pounds of barium hydroxide pentahydrate, 17.3 pounds of filter aid, and about 5 pounds of about 40 mesh iron filings were reacted in a nitrogen atmosphere by heating to boiling. The reaction was completed within about 10 minutes, and about 97.2 pounds of ferrous sulfate heptahydrate dissolved in about 21 gallons of water and containing about 0.97 pound of degreased iron filings was then added to the mixture. The atmosphere of nitrogen was then replaced by an atmosphere of carbon dioxide. The barium sulfate which formed was separated from the liquor by filtration under an atmosphere of carbon dioxide, and the filter cake was washed with about 25 gallons of carbonated water, which was free of air. The filtrate was evaporated under reduced pressure to complete dryness. About 125 pounds of pure ferrous glutamate was produced.

Having thus fully described and illustrated the character of the instant invention, what is desired to be protected by Letters Patent is:

1. A process for the production of the ferrous salt of a monoamino lower alkyl dicarboxylic acid which comprises reacting an alkaline earth metal salt of said amino acid with a water soluble ferrous salt whose anion forms a water insoluble salt with the alkaline earth metal in the presence of metallic iron in an atmosphere of a non-oxidizing gas inert under the conditions obtaining, and separating the ferrous salt of the amino acid from the reaction products.

2. A process for the production of the ferrous salt of a monoamino lower alkyl dicarboxylic acid which comprises reacting an alkaline earth metal salt of the amino acid selected from the group consisting of the calcium salt and the barium salt with a water soluble ferrous salt whose anion forms a water insoluble salt with the alkaline earth metal in the presence of metallic iron and in an atmosphere of a non-oxidizing gas inert under the conditions obtaining, separating the insoluble salt from the reaction products, and evaporating the solution to dryness to obtain the ferrous salt.

3. The process of claim 2 wherein the alkaline earth metal is barium, and the ferrous salt is ferrous sulfate.

4. The process of claim 2 wherein the alkaline earth metal is calcium, and the ferrous salt is ferrous sulfate.

5. A process for the production of the ferrous salt of a monoamino lower alkyl dicarboxylic acid which comprises reacting an alkaline earth metal salt of the amino acid selected from the group consisting of the calcium salt and the barium salt with a water soluble ferrous salt whose anion forms a water insoluble salt with the alkaline earth metal in the presence of between about 1% and about 10% of metallic iron and in an atmosphere of nitrogen, separating the insoluble salt from the solution under a carbon dioxide atmosphere, and evaporating the resulting solution to complete dryness.

6. A process for the preparation of ferrous glutamate which comprises reacting an alkaline earth metal glutamate salt selected from the group consisting of barium glutamate and calcium glutamate with a water soluble ferrous salt whose anion forms a water insoluble salt of the alkaline earth metal in the presence of metallic iron and in an atmosphere of nitrogen, separating the insoluble salt from the reaction products in an inert atmosphere non-oxidizing under the conditions obtaining, and evaporating the resulting solution to dryness.

7. A process for the preparation of ferrous aspartate which comprises reacting an alkaline earth metal aspartate salt selected from the group consisting of calcium aspartate and barium aspartate with ferrous sulfate in the presence of metallic iron and in a nitrogen atmosphere, separating barium sulfate formed in the reaction under an atmosphere of carbon dioxide, and evaporating the resulting solution to dryness to obtain the ferrous aspartate.

8. A process for the preparation of the ferrous salt of a monoamino lower alkyl dicarboxylic acid which comprises heating an alkaline earth metal hydroxide selected from the group consisting of calcium hydroxide and barium hydroxide with the monoamino dicarboxylic acid in an aqueous suspension in the presence of metallic iron and in a non-oxidizing atmosphere inert under the conditions obtaining, reacting the resulting acid salt with a water soluble ferrous salt whose anion forms a water insoluble salt of the alkaline earth metal in the presence of metallic iron and in a non-oxidizing atmosphere, separating the insoluble salt from the solution, and evaporating the solution to dryness.

9. A process for the preparation of the ferrous salt of a monoamino lower alkyl dicarboxylic acid which comprises heating an alkaline earth metal hydroxide selected from the group consisting of calcium hydroxide and barium hydroxide with a monoamino dicarboxylic acid in an aqueous suspension in the presence of metallic iron and in a nitrogen atmosphere at a temperature between about 95° C. and about 105° C., reacting the resulting acid salt with a water soluble ferrous salt, which forms a water insoluble salt of the alkaline earth metal in the presence of metallic iron and in a non-oxidizing atmosphere, separating the insoluble salt from the solution, and evaporating the solution to dryness.

10. A process for the production of ferrous glutamate which comprises heating barium hydroxide, glutamic acid and filter aid in an aqueous suspension in the presence of metallic iron in a nitrogen atmosphere at a temperature between about 95° C. and about 105° C., adding ferrous sulfate and metallic iron to the resulting mixture, replacing the nitrogen atmosphere with an atmosphere of carbon dioxide, separating barium sulfate from the resulting solution, and evaporating the solution to complete dryness.

11. A process for the production of ferrous glutamate which comprises heating calcium hydroxide and glutamic acid in an aqueous suspension in the presence of metallic iron and a filter aid in a nitrogen atmosphere at a temperature between about 95° C. and about 105° C., adding a water soluble ferrous salt whose anion forms a water insoluble calcium salt, and metallic iron to the resulting mixture, replacing the nitrogen atmosphere with an atmosphere of carbon dioxide, separating the insoluble calcium salt from the resulting solution, and evaporating the resulting solution to complete dryness.

References Cited in the file of this patent

FOREIGN PATENTS

| 264,390 | Germany | Feb. 1913 |
| 264,391 | Germany | Mar. 1913 |